United States Patent Office 3,053,824
Patented Sept. 11, 1962

3,053,824
COAGULATION OF LATICES OF NATURAL AND SYNTHETIC RUBBERS
Anton R. Heinz, Leverkusen, Germany, assignor to Farbenfabriken Bayer Aktiengesellschaft, Leverkusen, Germany, a corporation of Germany
No Drawing. Filed Nov. 3, 1959, Ser. No. 850,515
Claims priority, application Germany Nov. 14, 1958
6 Claims. (Cl. 260—92.3)

The present invention relates to a process for the coagulation of latices of natural and synthetic rubbers.

It is known that polymers of chloroprene (2-chlorobuta-1,3-diene) and, to an even stronger degree, natural rubber have a tendency to agglutinate and form lumps when they are precipitated from the corresponding latices by means of electrolytes, such for example as aqueous solutions of sodium chloride, calcium chloride or sulphuric acid. This disadvantageous property is especially pronounced with latices of chloroprene polymers or of copolymers of butadiene with acrylonitrile and/or styrene of low molecular weight, which are produced by using comparatively large quantities of molecular weight modifiers during polymerization. In the production of waterrepelling rubber, it is also known to carry out an aftertreatment with aluminum salts and to precipitate natural rubber latex by means of aluminum salts. In each case, however, a solid material which quickly forms lumps is then obtained, and the continuous technical working up of this material is difficult and costly.

It has now been found that latices of natural and synthetic rubbers can be converted by precipitation with electrolytes into completely stable coagulates of crumbly to fibrous form which do not stick to one another, if as coagulating agent aqueous solutions of mixtures of watersoluble aluminum and/or titanium salts with such watersoluble alkali metal and/or alkaline earth metal salts are used the cations of which are not precipitated by the anions of said aluminum and titanium salts and the anions of which do not precipitate the cations of said aluminum and titanium salts. Suitable salts are, for instance, the sulphate, the nitrate, the chloride, the acetate of alumium as well as ammonium and potassium aluminum sulphate; titaniumsulphate which is used in an aqueous solution acidified by sulphuric acid; the chlorides, bromides, nitrates, sulphhydrates of calcium, strontium, barium; the chlorides, bromides, nitrates, sulphites of lithium, sodium, potassium, ammonium; these salts being so selected that they do not precipitate each other when combined in an aqueous solution. Among the combinations possible those of aluminum sulphate, calcium chloride and/or sodium chloride are of primary interest. The coagulating baths produced from said salts preferably have a pH value of 1.5 to 4.5. In case that this pH value is not obtained by the salts dissolved in the coagulating baths, it may be adjusted by means of acids such as sulphuric or hydrochloric acid. For carrying through the coagulation the salts (calculated as anhydrous salts) are preferably applied in the following percentages by weight as calculated on the weight of the latex to be coagulated:

(a) 0.05 to 5% of aluminum and/or titanium salt
(b) 0.1 to 10% of earthen alkaline metal salt and/or
(c) 5 to 100%, preferably 10 to 40%, of alkaline metal salt.

As regards the concentration of the coagulating baths it is preferred to use coagulating baths containing about 0.02 to 2% of aluminum and/or titanium salts, 5 to 40% of alkaline metal salts and/or about 0.04 to 4% of earthen alkaline metal salts. The temperatures of the coagulating baths may vary within about +5° C. and 70° C.

The present process is especially suitable for the coagulation of latices of polychloroprene, polymers of butadiene and isoprene as well as copolymers of conjugated aliphatic diolefines having 4 to 6 carbon atoms with styrene, acrylonitrile and/or other monoolefines, such as acrylic acid, methacrylic acid, acrylates and methacrylates, said monoolefinic monomers being incorporated in said copolymers in amounts of about 0.5 to 40%. The process is of special importance for the coagulation of such synthetic rubbers which have a Defo value of about 100 to 2000, preferably 100 to 1000. (As to the definition of the Defo value compare "Kautschuk und Gummi," Vol. 3 (1950), pages 195, 205, 245, 279, 323, 364 and DIN 53 514.) Polymers with such Defo values are obtained in known manner by carrying through the polymerization of the respective monomers in aqueous emulsions in the presence of molecular weight regulators, such as higher alkyl mercaptans (n-dodecylmercaptan, tert. dodecylmercaptan). Furthermore, the process is also applicable for the coagulation of natural rubber latices. The latices are generally applied in concentrations varying between about 10 to 50% by weight as based on solid polymer. As regards the emulsifying agents present in the synthetic rubber latices, the present process is especially valuable for such latices which contain watersoluble salts, such as sodium, potassium, ammonium salts of disproportionated abietic acid (sold under the tradename "Dresinate") as emulsifiers in amounts of about 0.5 to 5% by weight.

In addition, the presence of salts of polyvalent acids, such for example as buffering substances, in the aqueous emulsions to be coagulated has proved advantageous, it being immaterial whether these substances are already present during polymerization or are only added before coagulation. Sodium pyrophosphate, primary, secondary or tertiary sodium orthophosphate, sodium borate and sodium metaphosphate have, for example, proved suitable for this purpose, these substances being preferably applied in quantities of about 0.05 to 1% by weight as calculated on the weight of latex.

According to one modification of the present invention, the coagulation of a rubber latex, especially of a polychloroprene latex, is effected by adjusting the pH value to about 5 to 7 (original pH value of the latex 7.5 to 12) after having added one of the above cited buffering agents, and adding the acid latex dropwise to, or running it into the stirred electrolyte solution so that the final mixture has a pH value of about 2 to 5. According to a further modification of the present invention, the latex having a pH value of 7.5 to 12, has added thereto the cited buffering agent and is thereafter added to the coagulating bath so as to obtain a final mixture having a pH value of about 6 to 7. The size and shape of the polymer particles formed can be largely influenced by suitable concentration of the salts, by the working temperature (+5° C. to 70° C.), and also the stirring and the supply speeds. The process can readily be carried out continuously.

The further processing to provide the dry polymer is thereafter carried out by known methods. The properties of a polychloroprene worked up in accordance with the electrolyte precipitation which has been described, correspond to those of a polychloroprene which has been isolated by freezing out the polymer. The process moreover includes the precipitation of those latices which additionally contain oils, fillers, stabilizers, plasticizers, ageresistors or other additives in dispersed or emulsified form for further processing.

*Example 1*

10 g. of Al$_2$(SO$_4$)$_3$, 18 H$_2$O and 15 g. of calcium chloride are dissolved in 4000 g. of water. 2000 g. of a 32% polychloroprene latex containing 5 g. of $Na_4P_2O_7$ and having a pH value of 5.5 are run into this solution at room temperature over a period of 30 seconds, while stirring. Complete coagulation takes place to form polymer particles which, almost without exception, are of a size of 0.1 to 0.2 cc. and which do not stick together, even after standing for several days. Filtration, washing with water and drying yields a polymer which is light in color and which has a Defo value of 350/16.

For comparison purposes, the following experiments are carried out:

(a) 1000 g. of latex (as in Example 1) are added to a solution of 50 g. of calcium chloride in 4000 g. of water. The precipitate immediately forms lumps.

(b) 1000 g. of polychloroprene latex (as in Example 1) are added to a solution of 400 g. of sodium chloride in 4000 g. of water at room temperature within a minute and while stirring. Coagulation and agglutination occurs to form a single lump of polymer.

(c) 1000 g. of latex (as in Example 1) are added to 4000 g. of a 5% hydrochloric acid, the coagulate immediately agglutinates to form large lumps.

(d) The procedure is that used in Example 1, with the difference that the latex is free from $Na_4P_2O_7$. The precipitate is very sticky and after a time forms lumps.

The above polychloroprene latex is produced as follows (the parts indicated being parts by weight):

100 parts of chloroprene are added while stirring to a polymerization medium comprising 40 parts of water, 0.4 part of n-dodecyl mercaptan, 2.8 parts of sodium salt of disproportionated abietic acid, 0.8 part of the sodium salt of the condensation product of naphthalene sulphonic acid and formaldehyde, 0.7 part of sodium hydroxide, 0.2 part of formamidine sulphinic acid. The polymerization temperature is 40° C. After 80% of the monomer have been polymerized, the residual monomer is removed by degasification.

*Example 2*

The procedure is the same as that followed in Example 1, with the difference that the solution contains 25 g. of calcium chloride and the same quantity of aluminum sulphate. Coagulation leads to completely stable, non-sticky polymer particles which are somewhat smaller than those described in Example 1. When 10 g. of calcium chloride are used, the particles are somewhat larger.

*Example 3*

The procedure is the same as that followed in Example 1, with the difference that the quantity of water used for dissolving the salts is 300 g. Slightly fibrous polymer particles with a slightly increased stickiness by comparison with those described in Example 1 are obtained.

*Example 4*

The procedure is that followed in Example 1, with the difference that 25 g. of $Al_2(SO_4)_3.18H_2O$ and 400 g. of sodium chloride are used. The coagulate consists of non-sticking particles which are almost exclusively of the size 0.1 to 0.2 cc.

*Example 5*

The electrolyte solution contains 8 g. of $AlCl_3.6H_2O$ and 20 g. of $BaCl_2.2H_2O$ to 4000 g. of water. The incorporation of 2000 g. of polychloroprene latex by stirring, as described in Example 1, provides a coagulate which does not form lumps. The particle size corresponds substantially to that of Example 4.

*Example 6*

A solution of 19 g. of $Al_2(SO_4)_3.18H_2O$ in 350 g. of water is added to 4000 g. of saturated common salt solution and then 1000 g. of polychloroprene latex (as in Example 1, but with a pH value 11.5) are run in while stirring. A non-sticking precipitate is obtained.

*Example 7*

The procedure is the same as that followed in Example 1, with the difference that the electrolyte solution contains 280 g. of sodium chloride and 250 ml. of a titanium salt solution containing sulphuric acid to 4000 g. of water, the said salt solution having been obtained by dissolving 16 g. of titanium tetrachloride in 80 ml. of dilute sulphuric acid and making up to 400 ml. The precipitate yields stable particles which are not sticky.

*Example 8*

A solution of 12 g. of $Al_2(SO_4).18H_2O$ and 16 g. of calcium chloride in 370 g. of water is added to 4000 g. of saturated common salt solution, and then 550 g. of 30% natural rubber latex are run in while stirring. Complete coagulation occurs to form non-sticky particles of fibrous form.

*Example 9*

10 g. of $Al_2(SO_4)_3.18H_2O$ and 20 g. of calcium chloride are dissolved in 4000 g. of water. 1000 g. of a 28% latex of a copolymer of 67 parts by weight of butadiene and 33 parts by weight of acrylonitrile with a Defo value of 900, produced at +10° C. with the use of the sodium salt of disproportionated abietic acid as emulsifier, are adjusted with dilute acetic acid to a pH value of 6 and added to the electrolyte solution. Complete precipitation in the form of crumbly, non-sticking particles is obtained.

I claim:

1. A method of coagulating a polychloroprene latex which comprises mixing a polychloroprene latex containing 0.05 to 1% by weight of a buffering agent selected from the group consisting of water-soluble phosphates and borates with an aqueous solution containing therein about 0.02 to 2% of a salt selected from the group consisting of aluminum and titanium salts, in combination with a member of the group consisting of about 5 to 40% of a water-soluble alkali metal salt and about 0.04 to 4% of a water-soluble alkaline earth metal salt, the cations of which are not precipitated by the anions of said aluminum and titanium salts and the anions of which do not precipitate the cations of said aluminum and titanium salts, said aqueous solution being applied in such amount, that the salts are present in amounts of (a) 0.05 to 5% of aluminum and titanium salt, (b) 0.1 to 10% of alkaline earth metal salt, and (c) 5 to 100% of alkali metal salt, said percentages being based on the weight of polychloroprene latex employed, said aqueous solution having a pH value of about 1.5 to 4.5 to produce a coagulate in the form of discrete particles, and isolating said coagulate.

2. A process according to claim 1 wherein the aqueous solution contains aluminum sulfate and sodium chloride.

3. A process according to claim 1 wherein said polychloroprene latex contains as an emulsifying agent about 0.5 to 5% of disproportioned abietic acid.

4. A process according to claim 1 wherein said buffering substance is a sodium phosphate.

5. A process according to claim 1 wherein said coagulation is conducted at temperatures between about +5 and 70° C.

6. A process for the coagulation of a polychloroprene latex which comprises adding a latex containing 0.05 to 1% by weight of a buffering substance selected from the group consisting of water-soluble phosphates and borates to an aqueous coagulating bath having dissolved therein a salt selected from the group consisting of water-soluble aluminum and titanium salts, and a salt selected from the group consisting of water-soluble alkali metal and alkali earth metal salt, the cations of which are not precipitated by the anions of said aluminum and titanium salts and the anions of which do not precipitate the cations of said aluminum and titanium salts, said salts being employed in amounts of (a) 0.5 to 5% of aluminum and titanium salt, (b) 0.01 to 10% of alkaline earth metal salt, and (c) 5 to 100% of alkali metal salt, said percentages being based on the weight of polychloroprene latex employed, and said coagulating bath having a pH of about 1.5 to 4.5, to produce a coagulate in the form of discrete particles, and then isolating said particles.

References Cited in the file of this patent

UNITED STATES PATENTS

| | | |
|---|---|---|
| 2,338,517 | Kitani | Jan. 4, 1944 |
| 2,378,693 | Fryling | June 19, 1945 |
| 2,386,449 | Dreisbach | Oct. 9, 1945 |
| 2,469,827 | Johnson | May 10, 1949 |
| 2,495,141 | Schmidt | Jan. 17, 1950 |

OTHER REFERENCES

Barron, H.: "Modern Synthetic Rubbers," 3rd ed., page 227, Chapman & Hall Ltd., London, 1949.